UNITED STATES PATENT OFFICE.

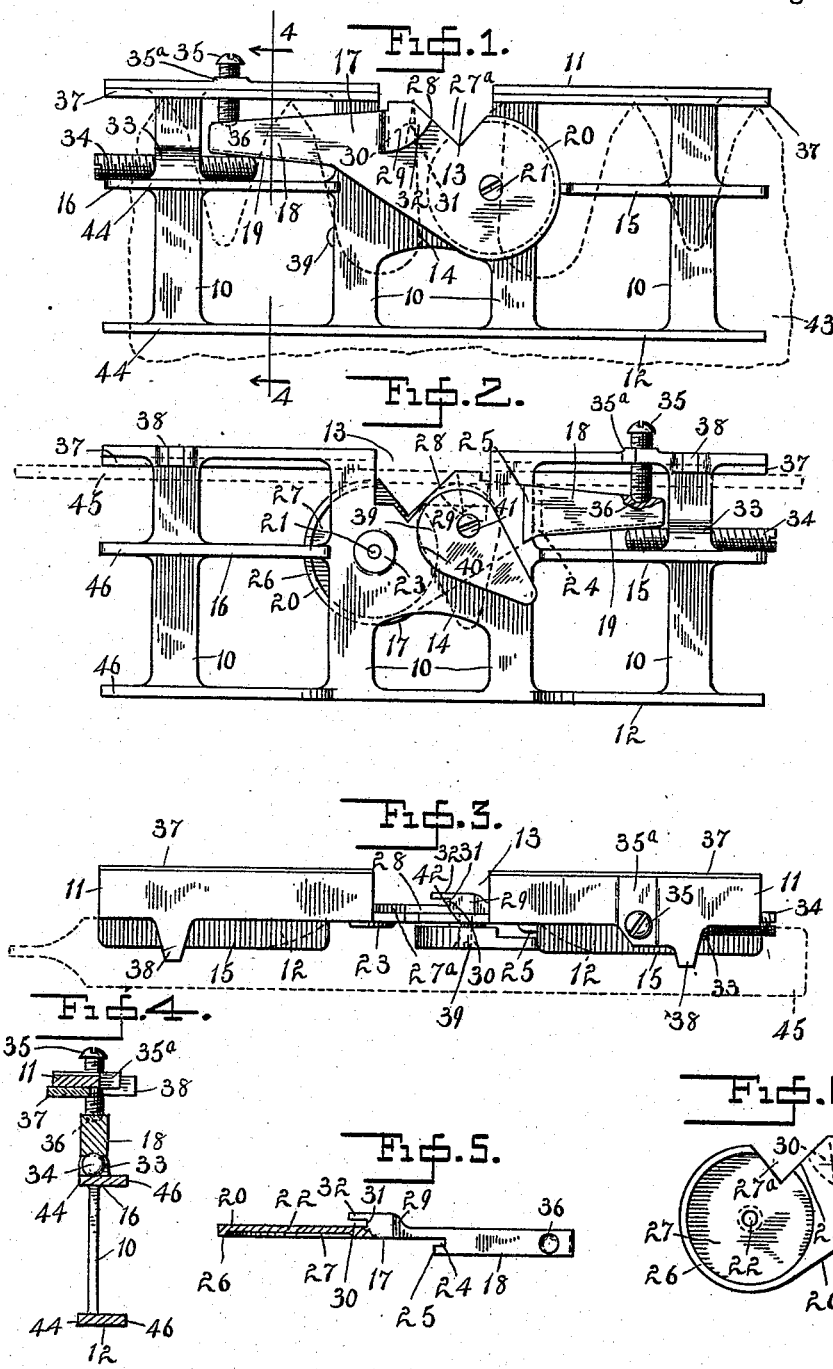

ARTHUR C. JONES, OF BIGFORK, MONTANA.

SAW-TOOTH GAGE.

932,612.  Specification of Letters Patent.  Patented Aug. 31, 1909.

Application filed August 12, 1908.  Serial No. 448,148.

*To all whom it may concern:*

Be it known that I, ARTHUR C. JONES, citizen of the United States, residing at Bigfork, in the county of Flathead and State of Montana, have invented certain new and useful Improvements in Saw-Tooth Gages, of which the following is a specification.

My invention relates to saw-tooth gages, having special reference to gages designed for use on that type of saws having cleaner or raker teeth.

The chief objects of the improvements which form the subject matter of this application are:—to provide a saw-tooth gage that will enable the operator to give a proper and uniform pitch to the beveled faces of the clearing teeth; to furnish a device that will aid in jointing the teeth of a saw in an efficient manner; and to produce a device that will enable the operator to put the teeth of a saw in proper order with accuracy and rapidity.

Further objects of my invention are to provide means for adjusting the gaging element so that any bevel within the limits of the adjusting mechanism may be given to the teeth of a saw and with uniform results; and to furnish suitable anti-friction plates that will engage the tips of the saw teeth and slide thereon without appreciable friction or injury to the points.

Other objects are to provide an efficient clamp for holding the jointing file, and to produce an appliance of the character stated that will be convenient to use and positive and efficient in its action.

I accomplish the above mentioned results by means of the apparatus illustrated in the accompanying drawing, forming a part of this application, and in which the details of construction are disclosed in the following views:—

Figure 1 is a front elevation of my improved saw-gage, showing the manner of applying the tool when used to gage the bevel faces of the cleaner teeth; Fig. 2 is a rear elevation showing the manner of clamping a jointer file; Fig. 3 is a top plan view; Fig. 4 is a sectional view taken on the line 4—4 of Fig. 1; Fig. 5 is a top plan view of the adjustable tooth-gage removed from the supporting frame, and Fig. 6 is a fragmentary view showing one end of the tooth-gage in side elevation.

Referring to the details of the drawing, the numeral 10 indicates upright frame members connected at their ends by flange plates 11, 12, the top flanges 11 being separated in the middle to form a gate or recess 13, which gives access to the tooth to be operated upon. The middle uprights are connected by an integral frame plate 14. Located upon both faces of the frame about midway between the top and bottom flanges are horizontal shelves or flanges 15, 16, connecting the uprights 10 and serving to strengthen the frame and at the same time acting as guide or slide members to engage the side of the saw during the processes of filing or jointing, hereinafter described.

Upon the front face of the frame is mounted a raker-tooth gage, in the shape of a flat plate or lever 17, tapering toward the end 18 upon its lower edge, forming an inclined surface 19. The opposite end or head 20 of the lever is circular in outline and reduced in thickness, and is secured to the frame plate 14 by a flat headed screw 21, which passes through a countersunk hole 22 in the center of the head 20 and engages a boss 23, cast on said plate. The head of the screw 21 forms a pivot upon which the lever gage 17 has a limited movement, and the head 20 of the lever is reduced in thickness upon the side next to the frame, so that the thicker arm of the lever will project between the uprights 10. The latter is provided with a groove 24, forming a lip or lug 25, which engages the rear face of the adjacent upright 10. The face of the head 20 next to the frame is counterbored, leaving an annular bearing flange 26. The metal that remains forms a thin elastic plate 27, which will become slightly dished when the screw 21 is tightened, and this will tend to throw the end 18 away from the frame and press the lug or lip 25 against the upright 10 with sufficient force to prevent lateral vibration during the process of filing. The upper margin of the gage member is supplied with an angular notch 27ª the inclined side 28 of the said notch forming a guide for gaging the bevel of the saw-tooth. Upon the front side of the lever 16, in proximity to the inclined side or face 28 of the notch, is a projection 29, and in the margin of this projection is a vertical groove or notch 30, in which is inserted the tooth to be filed, the bottom surface 31 of the groove serving as a gage or stop which engages the edge of the said tooth, the outer lip 32 acting as an abutment to engage the side of the tooth. The upright 10 in proximity to the end 18 of the lever is furnished with a boss 33, which is bored and tapered to receive a headless screw 34 extending horizontally beneath the end of the lever, the end of the said screw being suitably rounded to engage the inclined lower margin 19 of the said lever.

It will be seen that by entering or retracting the screw 34 the gage member 17 will be slightly turned upon its pivot screw 21, thus varying the angle of inclination of the gage face 28 to the saw tooth, and as the inclination of the margin 19 to the axis of the screw 34 is slight, a very fine adjustment is possible by this means. A clamping screw 35, having a threaded engagement with a reinforcement 35ª formed in the upper flange, is located directly over the end 18 of the gage lever, and has a rounded point to engage a suitable socket 36 in the upper margin of the said lever, and when the gage has been properly adjusted by the screw 34, it is locked in position by the said screw 35. To the lower surfaces of the top flanges 11 are cemented or otherwise secured anti-friction plates 37. These plates are preferably formed of a vitreous substance, such as glass, although plates of other material having a vitrified surface may be substituted therefor. These plates rest upon the points of the saw-teeth bearing the entire weight of the frame, and as their surfaces are extremely smooth and hard, they will glide easily over the teeth points with a minimum of resistance or wear and without appreciably dulling the teeth.

Projecting rearwardly from the upper flanges 11 are stop lugs 38, and upon the rear of the frame plate 14 is located a clamping plate or lever 39, having a curved margin 40 and secured to said plate by a flat-headed pivot screw 41, which passes through a countersunk hole in the said lever located eccentric with the curved margin 40 leaving the head of the screw flush with the outer surface so as not to interfere with the saw when the tool is applied thereto, and engaging a boss 42 integral with the said frame plate.

Having thus disclosed the details of construction of my improved raker tooth gage I will describe the manner in which it is used. Fig. 1 shows the application of the device to a saw, a fragment of the latter being indicated by the dotted outlines 43. The frame rests upon the toothed margin of the saw, with the glass plates engaging the teeth points. The front margins 44, of the middle and lower flanges lie in the same vertical plane and form guides which engage the saw plate. The adjustment of the inclined side 28 of the gage by means of the screws 34, 35, may be made while the gage is in position on the saw, or previous to its application thereto, as may be most convenient.

When used as a jointer gage, the jointing file is placed in the position shown by the dotted outlines 45, in Fig. 2, against the under surfaces of the lugs 38, and secured in place by turning the eccentric clamp 39 to the dotted position. The tool is then applied to the saw with the file 45 resting upon the teeth and the rear margins 46 of the middle and lower flanges engaging the side of the saw blade.

Having thus described my invention, what I claim as new, is:—

1. In a saw-tooth gage, the combination with a suitable frame, of a notched gage member pivoted to the frame, and means for adjusting said member upon its pivot.

2. In a saw-tooth gage, the combination with a suitable frame, of a notched gage member pivoted on said frame, means for adjusting said member, and means for locking the member in adjudged position.

3. In a saw-tooth gage, the combination with a suitable frame, of a notched gage member pivoted thereon, means for adjusting said member, means for locking the member when adjusted, and means for preventing lateral movement of the member.

In testimony whereof I affix my signature in the presence of two witnesses.

ARTHUR C. JONES.

Witnesses:
RICHARD GROOM,
EVERT HART.